US006697634B1

United States Patent
Hayashi

(10) Patent No.: US 6,697,634 B1
(45) Date of Patent: Feb. 24, 2004

(54) APPARATUS AND METHOD FOR SELECTING A TRANSMIT POWER VALUE FROM MULTIPLE CALCULATED POWER LEVELS

(75) Inventor: Masaki Hayashi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/674,293

(22) PCT Filed: Mar. 6, 2000

(86) PCT No.: PCT/JP00/01327

§ 371 (c)(1),
(2), (4) Date: Oct. 30, 2000

(87) PCT Pub. No.: WO00/54417

PCT Pub. Date: Sep. 14, 2000

(30) Foreign Application Priority Data

Mar. 6, 1999 (JP) .......................................... 11-103044

(51) Int. Cl.[7] .................................................. H04B 7/00
(52) U.S. Cl. .......................... 455/522; 455/69; 370/332
(58) Field of Search ................... 455/69, 522; 370/332, 370/331

(56) References Cited

U.S. PATENT DOCUMENTS

| 5,056,109 | A | * | 10/1991 | Gilhousen et al. | .......... 370/342 |
| 5,590,409 | A | * | 12/1996 | Sawahashi et al. | .......... 455/69 |
| 5,839,056 | A | * | 11/1998 | Hakkinen | .................... 455/69 |
| 5,852,782 | A | * | 12/1998 | Komatsu | .................... 455/522 |
| 5,887,245 | A | * | 3/1999 | Lindroth et al. | .............. 455/69 |
| 5,999,826 | A | * | 12/1999 | Whinnett | .................... 455/562 |
| 6,002,942 | A | * | 12/1999 | Park | ............................. 455/522 |
| 6,032,026 | A | | 2/2000 | Seki et al. | |

(List continued on next page.)

FOREIGN PATENT DOCUMENTS

| EP | 0682417 | 11/1995 |
| EP | 0682419 | 11/1995 |
| JP | 680 160 A2 * | 4/1995 |
| JP | 682 418 A2 * | 5/1995 |
| JP | 0832513 | 2/1996 |
| JP | 0832514 | 2/1996 |
| JP | 0870274 | 3/1996 |
| KR | 1998 079874 | 11/1998 |

OTHER PUBLICATIONS

Korean Office Action dated Sep. 4, 2002.
English translation of Korean Office Action.
"Specification of Air–Interface for 3G Mobile System" vol. 3, ver. 1.0, Association of Radio Industries and Businesses (ARIB), pp. 88–92, Jan. 14, 1999.
K. Miya et al., "An Introduction of Transmitter Power Control Scheme for Downling on WCDMA/TDD System", IEICE, 1998(with partial English translation).
Patent Abstracts of Japan, Eisuke et al., Dec. 3, 1996.

*Primary Examiner*—Dwayne Bost
*Assistant Examiner*—Sujatha Sharma
(74) *Attorney, Agent, or Firm*—Stevens, Davis, Miller & Mosher, LLP

(57) ABSTRACT

After a channel is established, CL-TPC section 162 calculates a transmit power value based on a TPC command and carries out closed-loop transmit power control. At the same time, OL-TPC section 161 calculates a transmit power value based on a reception level and compensation value calculation section 164 calculates a compensation value based on a difference between the transmit power value output from CL-TPC section 162 and that of OL-TPC section 161. After the compensation value is confirmed, mode switching section 165 switches between switches 167 and 169 and open-loop transmit power control is performed using a value obtained by adding the compensation value to the reception-level-based transmit power value. This makes it possible to compensate a reception level measurement error without the need to maintain high reception measurement accuracy, and further handle cases where high-speed fading or intense interference emerges.

18 Claims, 12 Drawing Sheets

U.S. PATENT DOCUMENTS

| | | | | |
|---|---|---|---|---|
| 6,055,415 | A | * | 4/2000 | Suzuki ........................ 455/69 |
| 6,072,784 | A | * | 6/2000 | Agrawal et al. ............. 370/311 |
| 6,144,860 | A | * | 11/2000 | Komatsu .................... 455/522 |
| 6,236,863 | B1 | * | 5/2001 | Waldroup et al. ........... 455/522 |
| 6,243,591 | B1 | * | 6/2001 | Takemura ................... 455/522 |
| 6,343,206 | B1 | * | 1/2002 | Miya et al. .................. 455/69 |
| 6,347,231 | B1 | * | 2/2002 | Miya .......................... 455/522 |
| 6,408,193 | B1 | * | 6/2002 | Katagishi et al. ........... 455/571 |
| 6,445,930 | B1 | * | 9/2002 | Bartelme et al. ........... 455/522 |
| 6,512,917 | B1 | * | 1/2003 | Hiramatsu .................. 455/69 |
| 6,512,931 | B1 | * | 1/2003 | Kim et al. .................. 455/522 |

* cited by examiner

APPARATUS AND METHOD FOR SELECTING A TRANSMIT POWER VALUE FROM MULTIPLE CALCULATED POWER LEVELS

TECHNICAL FIELD

The present invention relates to an apparatus and method for transmission/reception carrying out transmit power control, mounted on a communication apparatus in a mobile radio communication system.

BACKGROUND ART

CDMA (Code Division Multiple Access), one of radio communication access systems, is an access system in which a same frequency or same time is shared by a plurality of users. In the case where a desired transmitting station is far and an undesired interfering station is near, if these stations carry out transmission with same power, the signal level from the interfering station is greater than the signal level of the desired transmitting station, causing a problem of rendering communication impossible.

In a terrestrial mobile communication system, one of the causes of deterioration of channel quality is fading. Along a terrestrial mobile communication propagation path, a signal sent from a base station is reflected, scattered or diffracted by buildings near a communication terminal, producing a standing wave. When the communication terminal moves amidst this standing wave, the level of the signal from the base station reduces in proportion to the traveling speed causing fading by which the reception quality deteriorates.

Therefore, a cellular system using CDMA solves the above problem through transmit power control (TPC), which compensates fading fluctuations and keeps the reception level constant.

Typical examples of transmit power control are closed-loop transmit power control and open-loop transmit power control.

Closed-loop transmit power control is implemented by the other end of communication measuring an SIR equivalent to the reception quality for the transmission signal from the transmitting station, sending a control command (hereinafter referred to as "TPC command") which reduces transmit power when a measured SIR value is higher than a target SIR and increases transmit power when the measured SIR value is lower than the target SIR through the reverse channel, and therefore closed-loop transmit power control is a method of controlling transmit power based on the content of the TPC command.

On the other hand, open-loop transmit power control is a method of controlling transmit power by subtracting the reception level from a known transmission level of the other end of communication, calculating the level of loss along the radio path and adding a target reception level of the other end of communication to this level of loss.

However, closed-loop transmit power control involves a large control delay and has difficulty in controlling dynamically, having a disadvantage that the communication quality of the system may drastically reduce when high-speed fading or intense interference emerges.

On the other hand, open-loop transmit power control cannot handle the case where an appropriate reception level varies from one base station to another, which may cause offset errors at the reception levels of the base stations, and moreover open-loop transmit power control cannot compensate reception level measurement errors for every communication terminal, resulting in the necessity for increasing the measurement accuracy on the receiving side of the communication terminal.

That is, both closed-loop transmit power control and open-loop transmit power control have advantages and disadvantages regarding transmit power control.

DISCLOSURE OF INVENTION

It is a first object of the present invention to provide an apparatus and method for transmission/reception by adaptively switching between closed-loop transmit power control and open-loop transmit power control thereby making the most of both characteristics and compensating reception level measurement errors without the necessity of maintaining high reception measurement accuracy, and providing transmit power control capable of handling cases where high-speed fading or intense interference emerges.

This object is attained by carrying out closed-loop transmit power control using a transmit power value based on a TPC command after establishment of a communication channel, calculating a compensation value based on a difference between a reception-level-based transmit power value and a TPC-command-based transmit power value and carrying out open-loop transmit power control using a value obtained by adding the compensation value to the reception-level-based transmit power value after the calculation of the compensation value.

BEST MODE FOR CARRYING OUT THE INVENTION

With reference now to the attached drawings, embodiments of the present invention will be explained in detail below.

Embodiment 1

Figure 1:
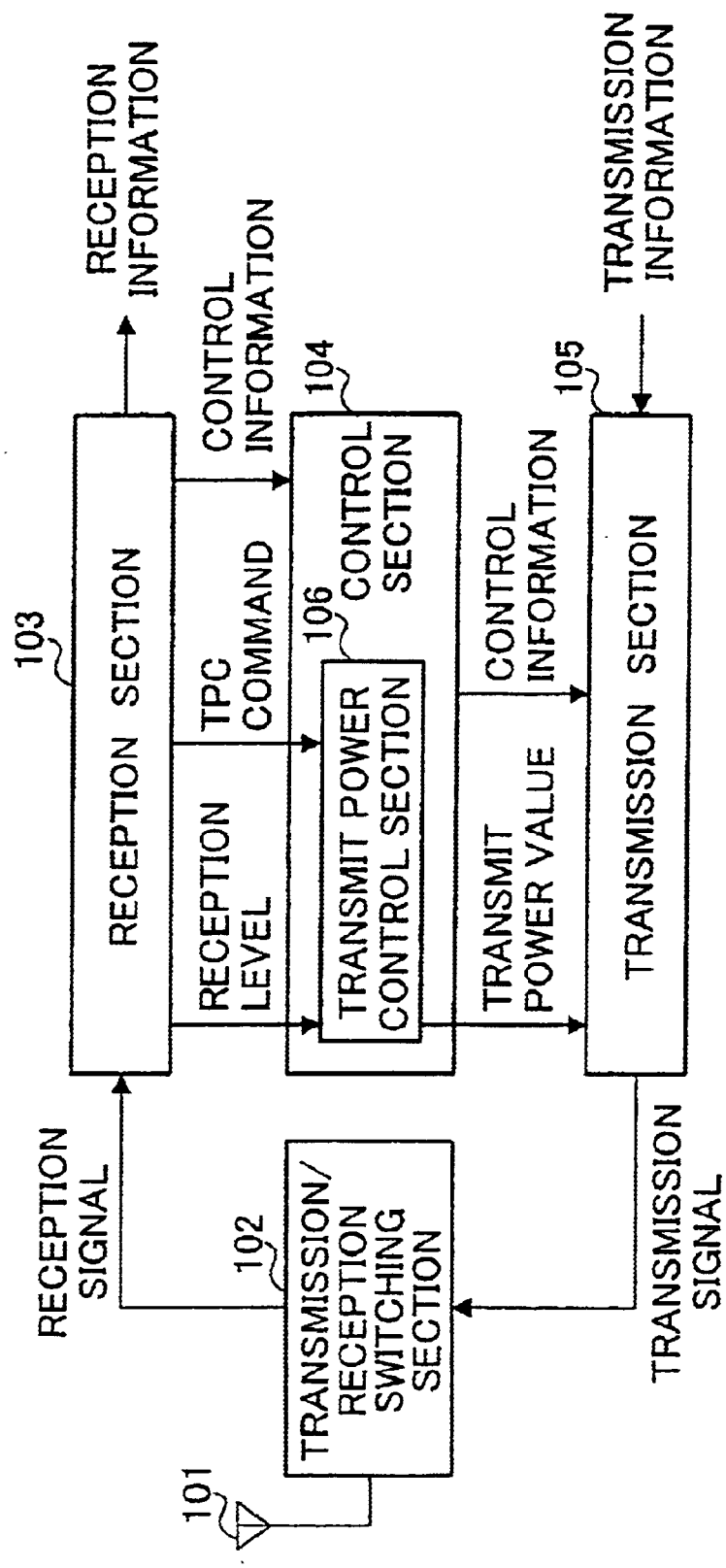
FIG. 1 is a block diagram showing a configuration of a communication terminal equipped with a transmission/reception apparatus according to Embodiment 1 of the present invention.

FIG. 1 is a block diagram showing a configuration of a communication terminal equipped with a transmission/reception apparatus according to Embodiment 1 of the present invention.

The communication terminal shown in FIG. 1 is mainly configured by antenna 101 that transmits/receives a radio frequency signal wave, transmission/reception switching section 102 that switches the timing of transmission/reception, reception section 103 that processes the reception signal and extracts reception information, control information, TPC commands and reception level, control section 104 that controls various sections based on the control information, TPC commands and reception level and transmission section 105 that sends a transmission signal carrying the transmission information and control information. Control section 104 includes transmit power control section 106 that decides a transmit power value based on the reception level or a TPC command.

Figure 2:
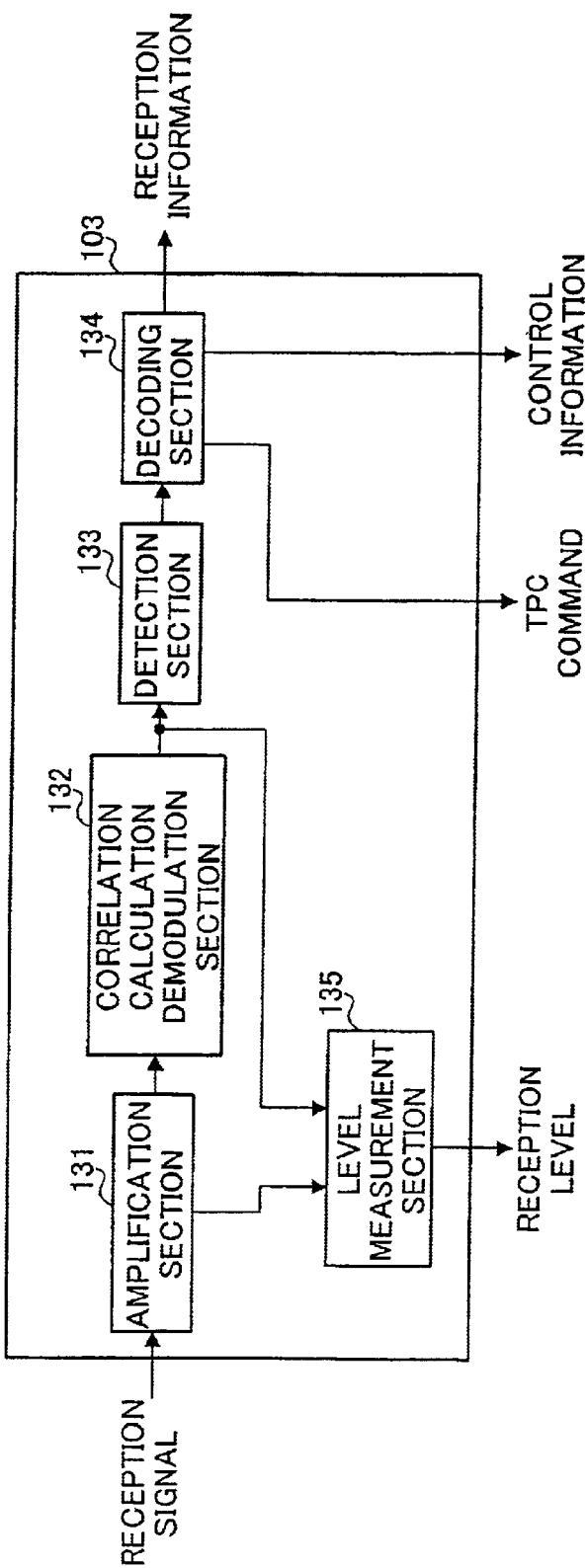
FIG. 2 is a block diagram showing a configuration of a reception section of the communication terminal according to Embodiment 1 of the present invention.

FIG. 2 is a block diagram showing a configuration of reception section 103 of the communication terminal according to Embodiment 1 of the present invention.

Reception section 103 includes amplification section 131 that amplifies a reception signal, correlation calculation demodulation section 132 that converts the frequency of the amplified reception signal to a baseband, carries out correlation calculation and demodulates a desired signal, detection section 133 that carries out detection processing using a correlation value and extracts decoded data, decoding section 134 that carries out decoding processing such as Viterbi decoding on the decoded data and outputs reception information, control information and a TPC command and level measurement section 135 that measures an SIR, a ratio of the level of the reception signal from amplifier section 131 to the level of the desired signal from correlation calculation demodulation section 132.

Figure 3:
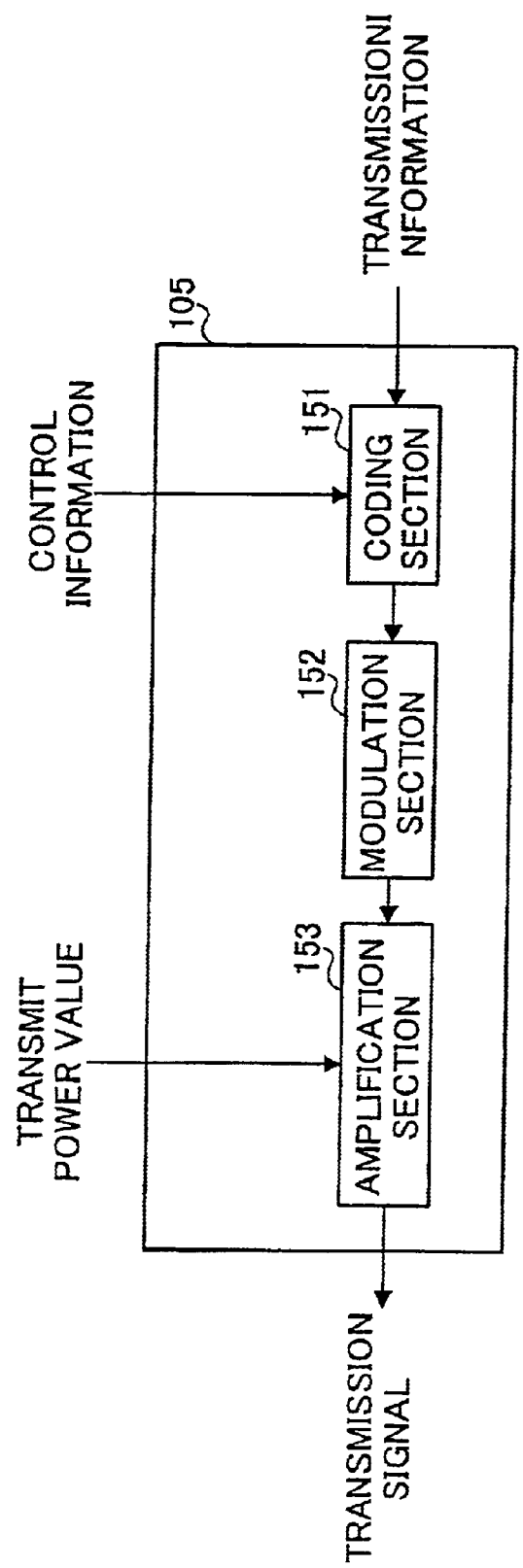
FIG. 3 is a block diagram showing a configuration of a transmission section of the communication terminal according to Embodiment 1 of the present invention.

FIG. 3 is a block diagram showing a configuration of transmission section 104 of the communication terminal according to Embodiment 1 of the present invention.

Transmission section 104 includes coding section 151 that inserts control information into the transmission information and carries out coding processing of a convolutional code, etc., modulation section 152 that performs primary modulation and spreading processing on the coded data and converts the frequency to a radio frequency and amplification section 153 that amplifies the transmission signal modulated based on the transmit power from transmit power control section 106.

Figure 4:
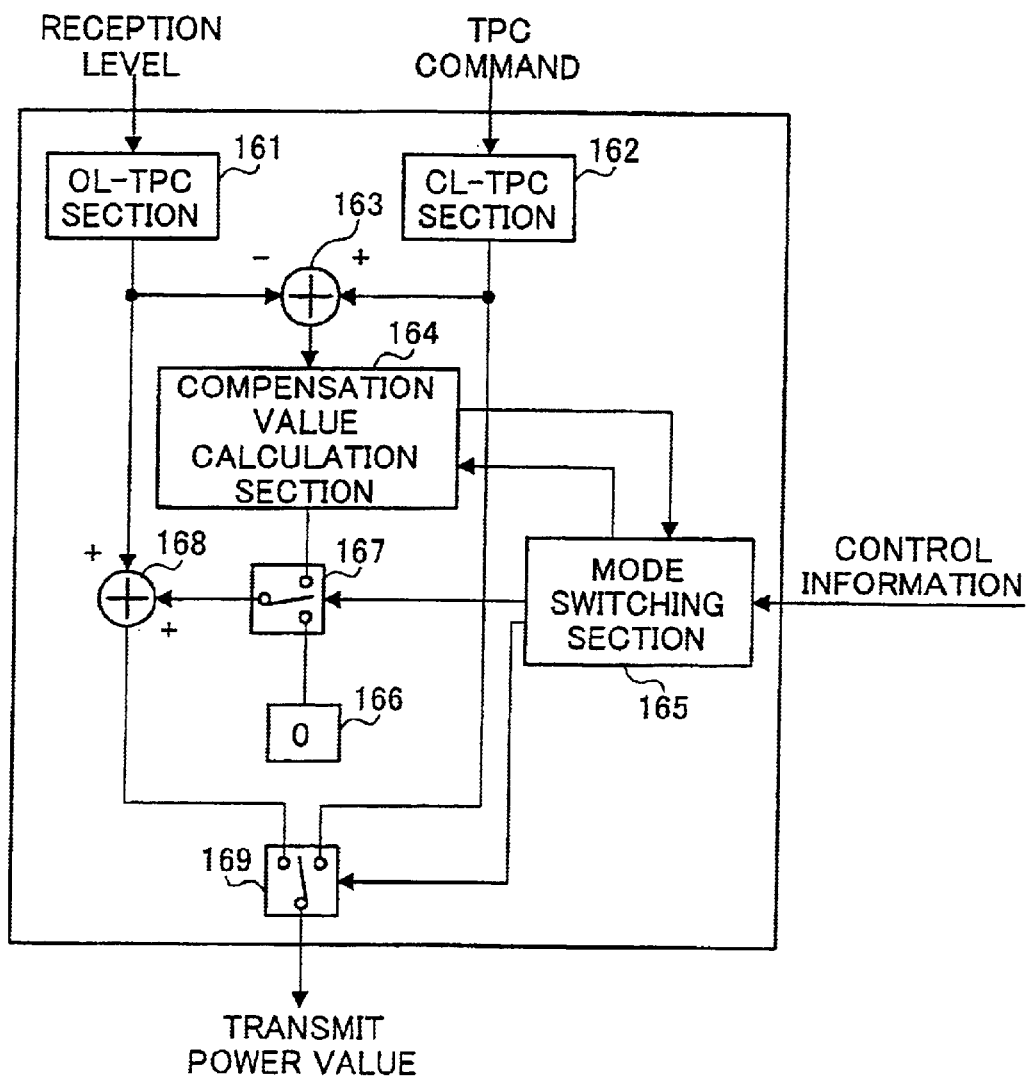
FIG. 4 is a block diagram showing a configuration of a transmit power control section of the communication terminal according to Embodiment 1 of the present invention.

FIG. 4 is a block diagram showing a configuration of transmit power control section 106 of the communication terminal according to Embodiment 1 of the present invention.

OL-TPC (open-loop transmit power control) section 161 subtracts the reception level output from level measurement section 135 from a known transmission level of the other end of communication, calculates the level lost along a radio path, and determines a transmit power value by adding a target reception level of the other end of communication to this loss level. For example, in the case where the reception level is lower than the transmission level of the other end of communication by 25 dB, the transmit power is incremented by 25 dB above the target reception level of the other end of communication.

CL-TPC (closed-loop transmit power control) section 162 calculates a transmit power value by incrementing/decrementing the previous transmit power value by a predetermined amount of variation based on the content of a TPC command output from decoding section 134. For example, in the case where TPC command "0" is an increment instruction, TPC command "1" is a decrement instruction and an amount of variation is 1 dB, CL-TPC section 162 increments the transmit power by 1 dB above the previous transmit power when the TPC command is "0".

Subtractor 163 subtracts the transmit power value output from OL-TPC section 161 from the transmit power value output from CL-TPC section 162 and outputs the difference value to compensation value calculation section 164.

Compensation value calculation section 164 calculates and confirms a compensation value to compensate a reception level measurement error, etc. of the communication terminal based on the difference value output from subtractor 163. Then, when the compensation value is confirmed, compensation value calculation section 164 outputs the control information indicating the confirmation to mode switching section 165. On the other hand, when a control signal is input from mode switching section 165, compensation value calculation section 164 fixes the confirmed compensation value and outputs it to switch 167.

An available method of confirming the compensation value includes a method of confirming an average of difference values when the range of fluctuations of the average of difference values falls below a predetermined threshold as the compensation value or a method of confirming an average of difference values when a certain time has elapsed after calculation of a compensation value is started as the compensation value, etc.

Furthermore, an available method of calculating an average includes a method of simply averaging difference values input for a certain period of time or a method of averaging by adding time weight to difference values, etc.

Mode switching section 165 switches and controls switch 167 and switch 169 based on a control information from decoding section 134 or compensation value calculation section 164. When a predetermined mode is entered, mode switching section 165 outputs a control signal to compensation value calculation section 164 and fixes the compensation value. Details of the operation of mode switching section 165 will be given later.

"0" data output section 166 outputs "0" as a compensation value. Switch 167 outputs a compensation value output from either compensation value calculation section 164 or "0" data output section 166 to adder 168 based on the control of mode switching section 165.

Adder 168 adds the compensation value from switch 167 to the output of OL-TPC section 161.

Switch 169 outputs the transmit power value output from either adder 168 or CL-TPC section 162 to amplification section 153 based on the control of mode switching section 165.

Figure 5:
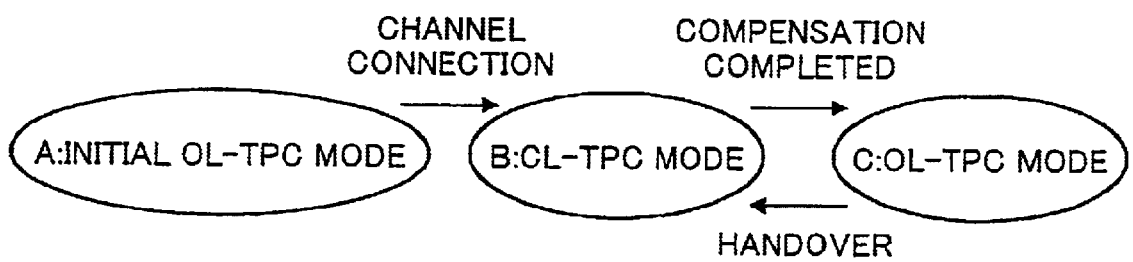
FIG. 5 is a state transition diagram of the communication terminal according to Embodiment 1 of the present invention.
Figure 6:
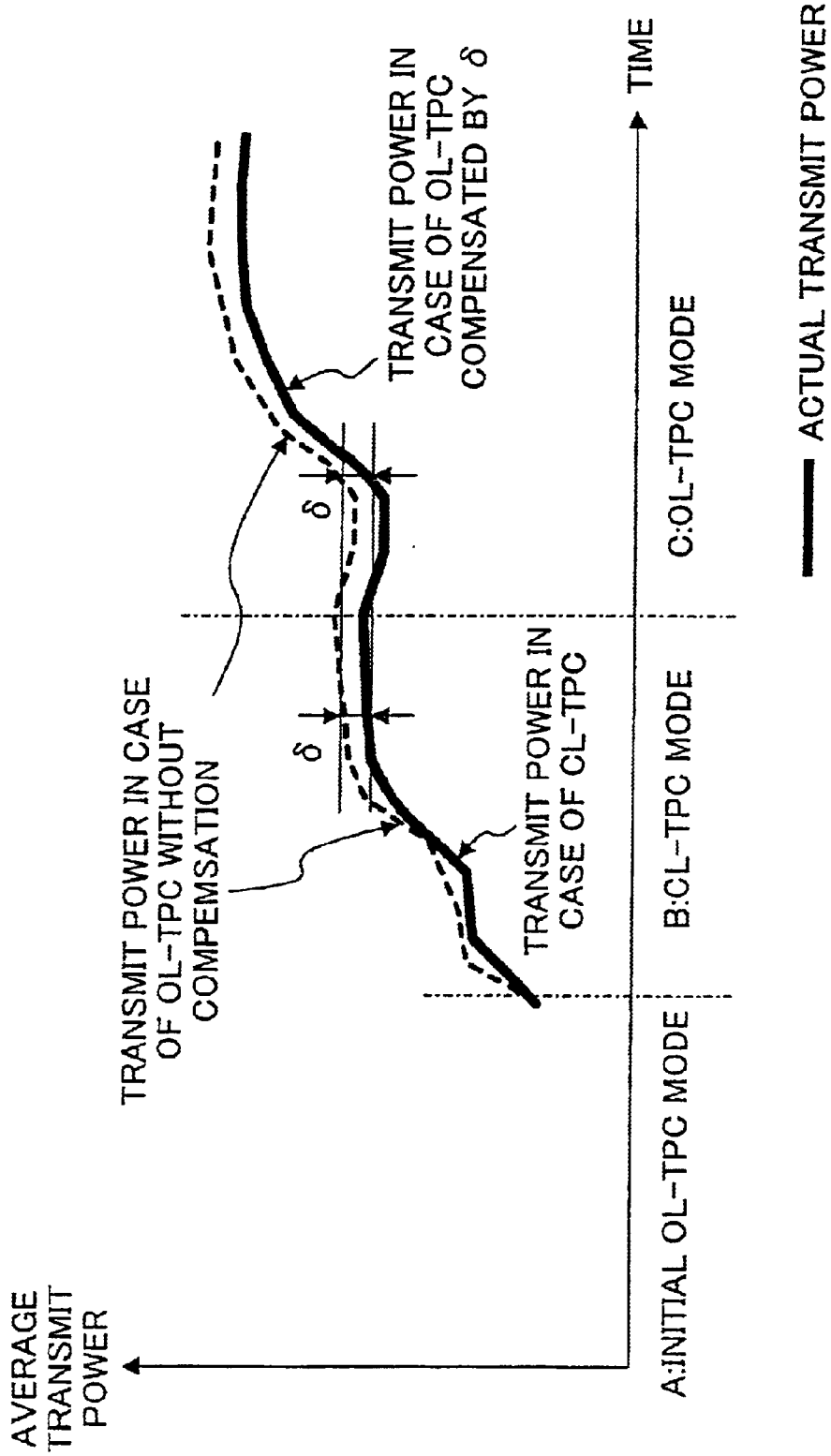
FIG. 6 is a diagram showing transition of transmit power of the communication terminal according to Embodiment 1 of the present invention.

Next, the operation of switching control by mode switching section 165 over switch 167 and switch 169 will be explained using the state transition diagram in FIG. 5 and transmit power transition diagram in FIG. 6.

First, as initial OL-TPC mode (A), during a period after power is turned on until a communication channel is established, mode switching section 165 connects switch 167 with "0" data output section 166 and connects switch 169 with adder 168. As a result, the communication terminal performs open-loop transmit power control that carries out no compensation on the transmit power value based on the reception level.

Then, upon receipt of the information that the communication channel has been established from the control information output from decoding section 134, mode switching section 165 connects switch 169 with CL-TPC section 162 and enters CL-TPC mode (B). As a result, the communication terminal performs closed-loop transmit power control with a transmit power value based on a TPC command carried on the reception signal.

Here, while closed-loop transmit power control is in progress, OL-TPC section 161 continues to calculate transmit power values. These are estimated transmit power values on assumption that open-loop transmit power control is carried out. Furthermore, as described above, compensation value calculation section 164 calculates and confirms a compensation value based on the value obtained by subtracting an estimated transmit power value from the transmit power value currently being used output from CL-TPC section 162 and outputs the control information that the compensation value has been established to mode switching section 165.

Upon receipt of the control information that the compensation value has been established, mode switching section 165 connects switch 167 with compensation value calculation section 164, connects switch 169 with adder 168 and enters OL-TPC mode (C). At this time, mode switching section 165 outputs a control signal to compensation value calculation section 164 to fix the compensation value. As a result, the communication terminal performs open-loop transmit power control using a transmit power value obtained from the reception-level-based transmit power value by compensating a reception level measurement error, etc.

Compensating a reception level measurement error, etc. for the reception-level-based transmit power value makes it possible to obtain a transmit power value almost identical to the transmit power value in the case where closed-loop transmit power control is carried out and further handle cases where high-speed fading or intense interference emerges. Once OL-TPC mode (C) is entered, the communication terminal maintains this state.

Figure 7:
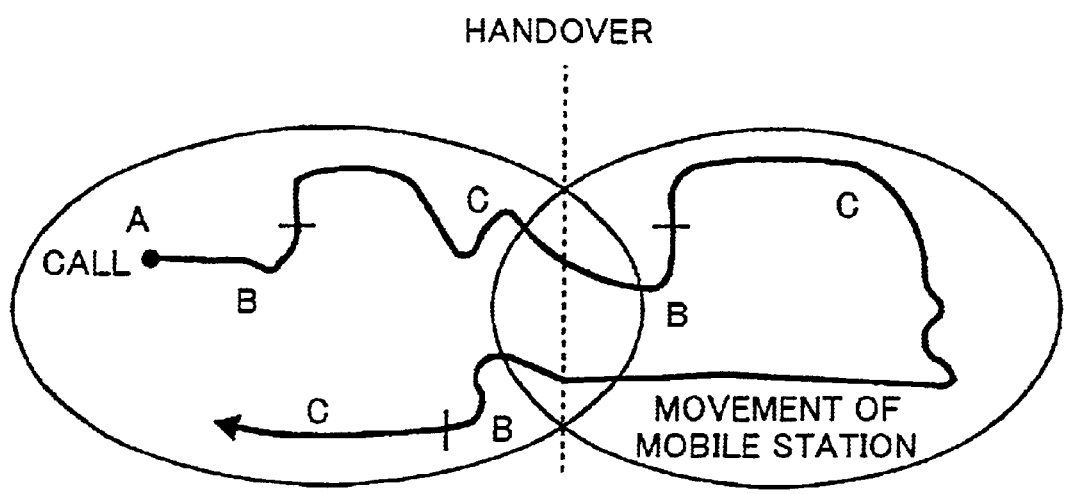
FIG. 7 is a state transition diagram during handover of the communication terminal according to Embodiment 1 of the present invention.

During handover, however, it is necessary to compensate a reception level error, etc. at the base station in the target cell, and therefore the communication terminal enters CL-TPC mode (B) and performs closed-loop transmit power control as shown in FIG. 7. Upon receipt of the information that handover starts from the control information output from decoding section 134, mode switching section 165 connects switch 169 with CL-TPC section 162, outputs a control signal to compensation value calculation section 164 to recalculate a compensation value.

Moreover, in cases other than handover where the communication terminal decides that the accuracy of the compensation value has reduced, it is also possible to change from OL-TPC mode (C) to CL-TPC mode (B). It is possible to decide that the accuracy of the compensation value has reduced when the communication terminal monitors a TPC command and detects that an increment instruction or decrement instruction is repeated for a certain number of times or that there is an extreme difference in the rate between increment instructions and decrement instructions during a certain period of time. It is also possible for the base station to decide that the accuracy of the compensation value has reduced based on the communication quality such as a reception level, SIR and error detection code and transmit the decision result to the communication terminal as the control information.

Figure 8:
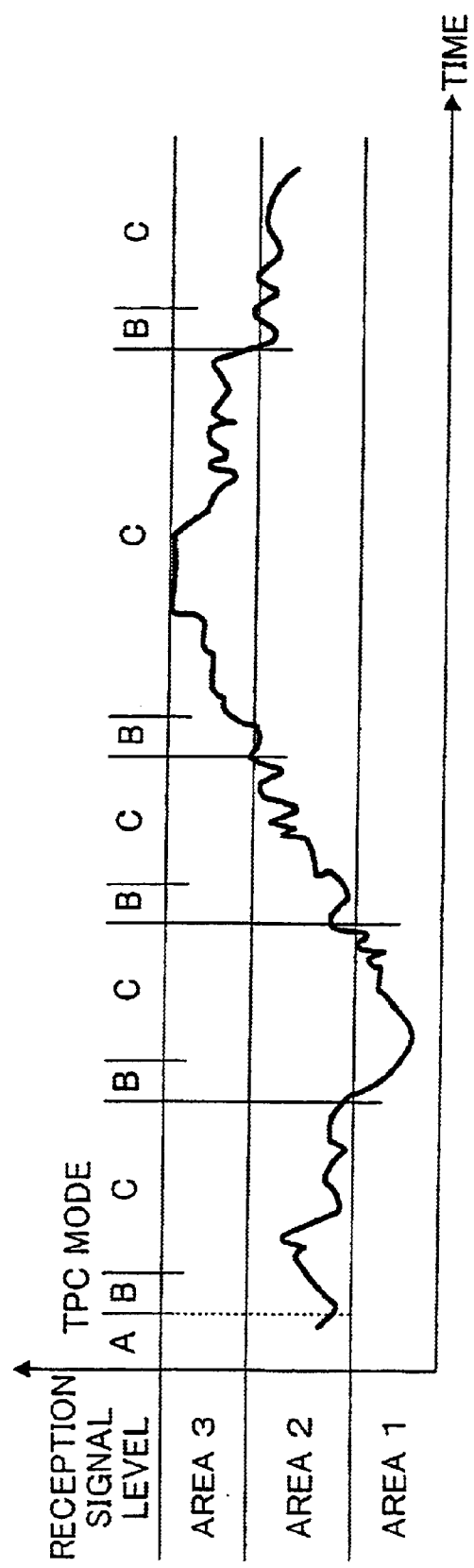
FIG. 8 is a state transition diagram based on classification of reception levels of the communication terminal according to Embodiment 1 of the present invention.

Furthermore, as shown in FIG. 8, it is also possible to divide the reception level into a certain number of areas and enter CL-TPC mode (B) when the average reception level moves across the divided areas during a certain period of time. This is effective when the trend of errors varies depending on the reception level.

It is also possible for the communication terminal to set an effective period of time for compensation values beforehand and enter CL-TPC mode (B) when the effective period of time has elapsed after OL-TPC mode (C) is entered.

As shown above, by calculating a compensation value to compensate a reception level measurement error, etc. while closed-loop transmit power control is in progress and carry out open-loop transmit power control using a value obtained by adding the compensation value to the reception-level-based transmit power value, it is possible to compensate the reception level measurement error without the need to maintain high reception measurement accuracy and carry out transmit power control capable of even handling cases where high-speed fading or intense interference emerges.

Moreover, open-loop transmit power control has fewer TPC errors than closed-loop transmit power control, and therefore the present invention in which open-loop transmit power control occupies a great percentage of time can increase the channel capacity of the system.

The present invention can also adaptively switch between open-loop transmit power control and closed-loop transmit power control as the transmit power control method as required.

Embodiment 2

Embodiment 1 describes the case where the communication terminal adaptively switches between open-loop transmit power control and closed-loop transmit power control.

Here, while the communication terminal is carrying out open-loop transmit power control, the base station need not send a TPC command. Therefore, the transmission efficiency over the downlink will improve if the base station detects that the communication terminal is carrying out open-loop transmit power control and sends other information instead of a TPC command.

Figure 9:
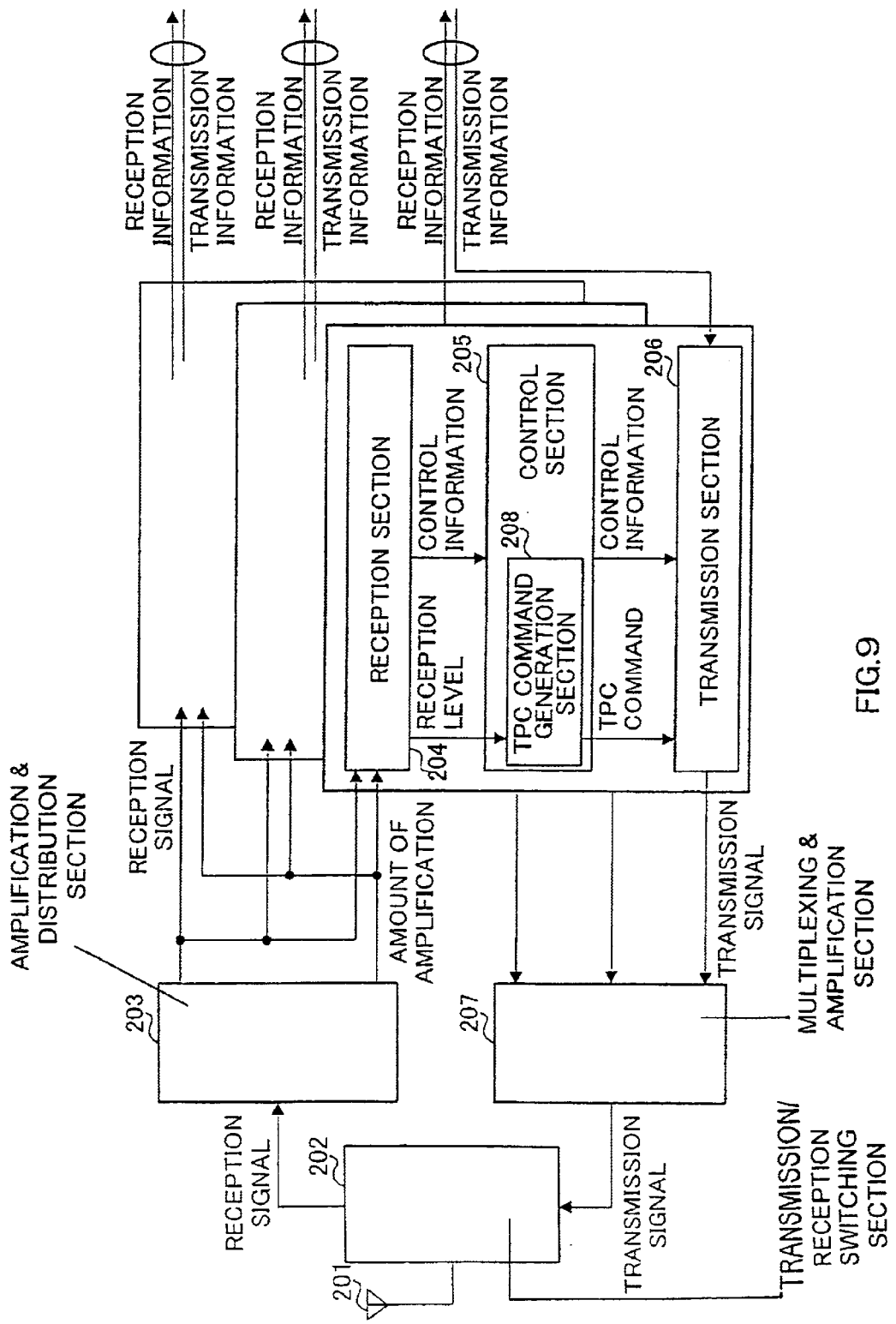
FIG. 9 is a block diagram showing a configuration of a base station according to Embodiment 2 of the present invention.

Embodiment 2 provides a mode in which the base station does not send any TPC command while the communication terminal equipped with the transmission/reception apparatus according to Embodiment 1 is carrying out open-loop transmit power control. FIG. 9 is a block diagram showing a configuration of the base station according to Embodiment 2 of the present invention.

The base station shown in FIG. 9 is mainly configured by antenna 201 that transmits/receives a radio frequency signal wave, transmission/reception switching section 202 that switches the timing of transmission/reception, amplification distribution section 203 that distributes the amount of amplification of the reception signal over a number of users, reception section 204 that processes the reception signal and extracts reception information, control information and reception level, control section 205 that controls various sections based on the control information and the reception level, transmission section 206 that sends a transmission signal carrying the transmission information, control information and a TPC command and multiplexing, amplification section 207 that multiplexes and amplifies transmission signals to users. Control section 205 includes TPC command generation section 208 that generates TPC commands based on the reception level.

Figure 10:
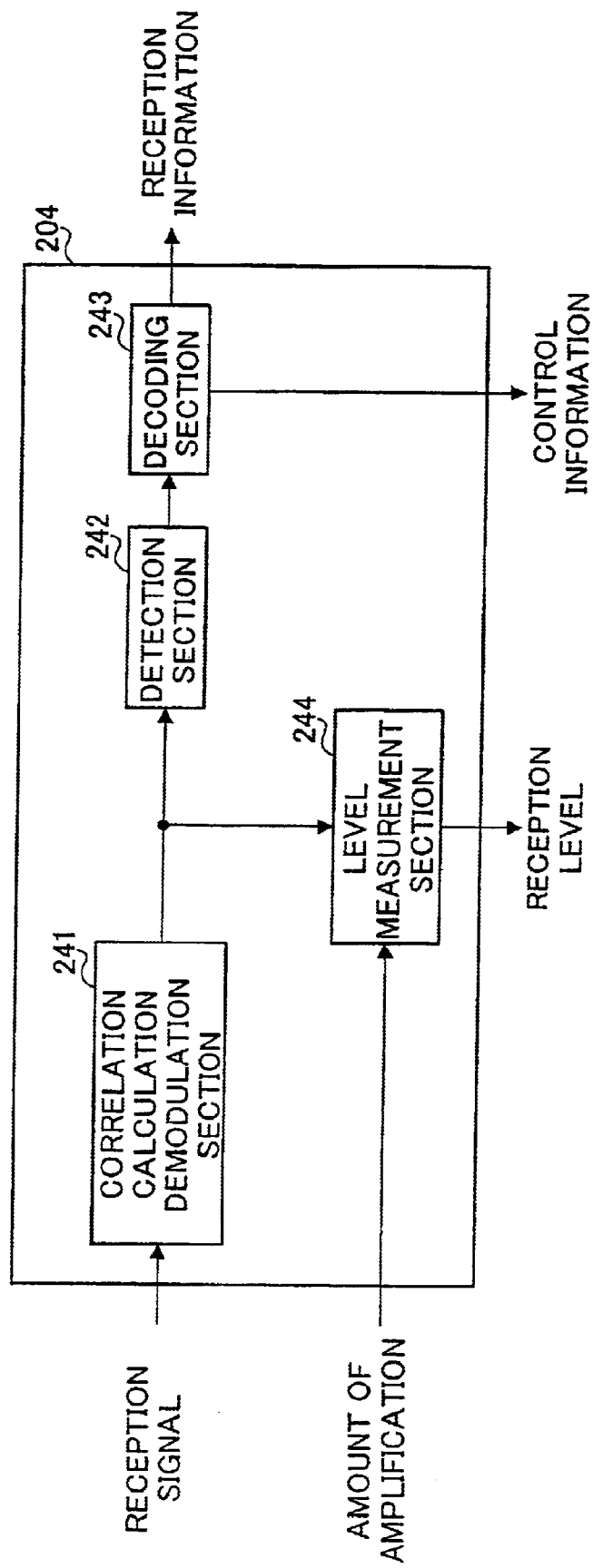
FIG. 10 is a block diagram showing a configuration of a reception section of the base station according to Embodiment 2 of the present invention.

FIG. 10 is a block diagram showing a configuration of reception section 204 of the base station according to Embodiment 2 of the present invention.

Reception section 204 includes correlation calculation demodulation section 241 that converts the frequency of the reception signal to a baseband, carries out correlation calculation and demodulates a desired signal, detection section 242 that carries out detection processing using a correlation value and extracts decoded data, decoding section 243 that carries out decoding processing such as Viterbi decoding on the decoded data and outputs reception information and control information and level measurement section 244 that measures an SIR, a ratio of the amount of amplification from amplification, distribution section 203 to the level of the desired signal from correlation calculation demodulation section 132.

Figure 11:
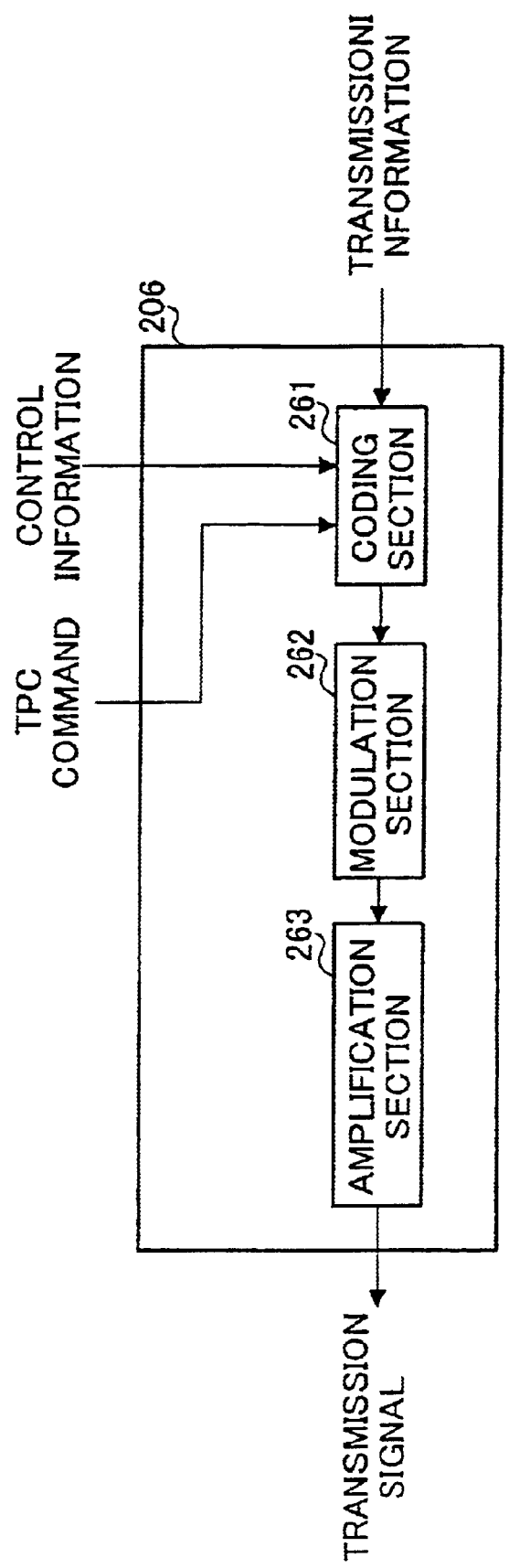
FIG. 11 is a block diagram showing a configuration of a transmission section of the base station according to Embodiment 2 of the present invention.

FIG. 11 is a block diagram showing a configuration of transmission section 206 of the base station according to Embodiment 2 of the present invention.

Transmission section 206 includes coding section 261 that inserts control information and a TPC command into the transmission information and carries out coding processing of a convolutional code, etc., modulation section 262 that performs primary modulation and spreading processing on the coded data and converts the frequency to a radio frequency and amplification section 263 that amplifies the modulated transmission signal.

Figure 12:
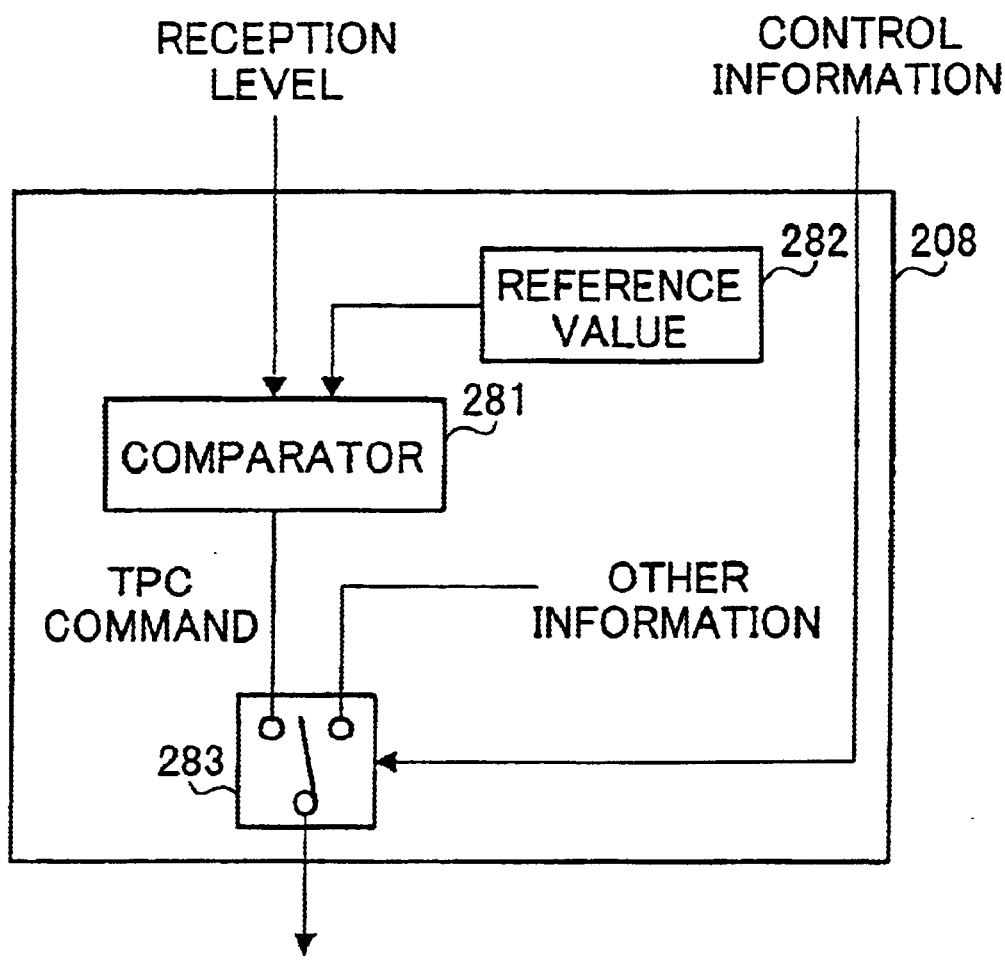
FIG. 12 is a block diagram showing a configuration of a TPC command generation section of the base station according to Embodiment 2 of the present invention.

FIG. 12 is a block diagram showing a configuration of TPC command generation section 208 of the base station according to Embodiment 2 of the present invention.

In FIG. 12, comparator 281 generates a TPC command to instruct the communication terminal to increment or decrement transmit power based on whether the reception level output from level measurement section 244 is higher or lower than reference value 282.

Switch 283 inserts the TPC command output from comparator 281 or other information at the position of a transmission slot into which the TPC command is to be inserted, based on the control information from decoding section 243.

That is, switch 283 inserts the TPC command in the case where the communication terminal is carrying out closed-loop transmit power control and other information in the case where the communication terminal is carrying out open-loop transmit power control.

As described above, by transmitting other information instead of a TPC command while the other end of communication is carrying out open-loop transmit power control, it is possible to improve the transmission efficiency. This is effective in the present invention in particular in which open-loop transmit power control occupies a great percentage of time.

Here, the embodiments above describe the case where the communication terminal decides the timing of switching between modes independently, but the present invention also allows the base station to decide the timing of switching between modes and instruct the communication terminal about the switching timing through control information.

The embodiments above describe transmit power control over the uplink of a communication terminal, but the present invention can also be used for transmit power control over the downlink by a base station.

The embodiments above describe the case where control information and TPC commands as well as transmission information are sent after error correction coding processing. However, the present invention allows the same effect to be obtained without performing error correction coding processing on control information and TPC commands. In this case, control information and TPC commands are extracted by the detection section.

As described above, the apparatus and method for transmission/reception of the present invention adaptively switches between closed-loop transmit power control and open-loop transmit power control making it possible to make the most of both characteristics and compensate reception level measurement errors without the necessity of maintaining high reception measurement accuracy, and further provide transmit power control capable of handling cases where high-speed fading or intense interference emerges.

This application is based on the Japanese Patent Application No. HEI 11-103044 filed on Mar. 6, 1999, entire content of which is expressly incorporated by reference herein.

What is claimed is:

1. A transmission/reception apparatus that adaptively switches between a closed loop transmit power control and an open loop transmit power control, comprising:
 a first power value calculator that calculates a first power value based on a reception level for the open loop transmit power control;
 a second power value calculator that calculates a second power value based on a TPC command in a received signal for the closed loop transmit power control;
 a compensation value calculator that calculates a compensation value based on a difference between the first power value and the second power value; and
 a power value selector that selects one of the first power value, the second power value, and a third power value obtained by adding the compensation value to the first power value as a transmit power value.

2. The transmission/reception apparatus according to claim 1, wherein the compensation value calculator averages a value obtained by subtracting the first power value from the second power value and in the case where a variation of the average value falls below a predetermined threshold, the average value is confirmed as the compensation value.

3. The transmission/reception apparatus according to claim 2, wherein the compensation value calculator averages a value obtained by subtracting the first power value from the second power value with time weight added.

4. The transmission/reception apparatus according to claim 1, wherein the power value selector selects the first power value as the transmit power value until a channel is established, selects the second power value as the transmit power value after the channel is established until the compensation value is confirmed and selects the third power value as the transmit power value after the compensation value is confirmed.

5. The transmission/reception apparatus according to claim 1, wherein the power value selector selects the second power value as the transmit power value during handover.

6. The transmission/reception apparatus according to claim 1, wherein the power value selector selects the second power value as the transmit power value when the accuracy of the compensation value deteriorates.

7. The transmission/reception apparatus according to claim 1, wherein the power value selector divides the reception level into a number of areas and when an average reception level during a predetermined period of time moves across the divided areas, selects the second power value as the transmit power value.

8. The transmission/reception apparatus according to claim 1, wherein the power value selector sets a valid period of time for the compensation value beforehand and selects the second power value as the transmit power value when the valid period of time has elapsed after the compensation value is confirmed.

9. The transmission/reception apparatus according to claim 5, wherein the compensation value calculator recalculates the compensation value when the power value selector selects the second power value as the transmit power value.

10. A communication terminal apparatus equipped with a transmission/reception apparatus that adaptively switches between a closed loop transmit power control and an open loop transmit power control, said transmission/reception apparatus comprising:

a first power value calculator that calculates a first power value based on a reception level for the open loop power control;

A second power value calculator that calculates a second power value based on a TPC command in a received signal for the closed loop power control;

a compensation value calculator that calculates a compensation value based on a difference between the first power value and the second power value; and a power value selector that selects one of the first power value, the second power value, and a third power value obtained by adding the compensation value to said first power value as a transmit power value.

11. A base station apparatus that stops transmission of a TPC command when the communication terminal apparatus according to claim 10 is performing transmit power control based on the reception level.

12. A base station apparatus equipped with a transmission/reception apparatus that adaptively switches between a closed loop transmit power control and an open loop transmit power control, said transmission/reception apparatus comprising:

a first power value calculator that calculates a first power value based on a reception level for the open loop transmit power control;

a second power value calculator that calculates a second power value based on a TPC command in a received signal for the closed loop transmit power control;

a compensation value calculator that calculates a compensation value based on a difference between the first power value and the second power value; and a power value selector that selects one of the first power value, the second power value, and a third power value obtained by adding the compensation value to said first power value as a transmit power value.

13. A communication terminal apparatus that stops transmission of a TPC command when the base station apparatus according to claim 12 is performing transmit power control based on the reception level.

14. A transmit power control method that adaptively switches between a closed loop transmit power control and an open loop transmit power control, said method comprising:

controlling transmit power by an open loop using a first transmit power value calculated based on a reception level until a channel is established, controlling the transmit power by a closed loop using a second transmit power value calculated based on a TPC command in a reception signal after the channel is established, calculating a compensation value from a difference between the first transmit power value and the second transmit power value, and controlling the transmit power using a third transmit power value obtained by adding said compensation value to said first transmit power value after said compensation value is confirmed.

15. The transmit power control method according to claim 14, wherein during handover, the transmit power is controlled using the second transmit power value and the compensation value is recalculated.

16. The transmit power control method according to claim 14, wherein when it is decided that the accuracy of the compensation value deteriorates, the transmit power is controlled using the second transmit power value and the compensation value is recalculated.

17. The transmit power control method according to claim 14, wherein the reception level is divided into a number of areas and when an average reception level during a predetermined period of time moves across the divided areas, the transmit power is controlled using the second transmit power value and the compensation value is recalculated.

18. The transmit power control method according to claim 14, wherein a valid period of time is set for the compensation value beforehand and when the valid period of time has elapsed after the compensation value is confirmed, the transmit power is controlled using the second transmit power value and the compensation value is recalculated.

* * * * *